United States Patent [19]
Landsman

[11] 4,064,205
[45] Dec. 20, 1977

[54] METHOD FOR MAKING A PRINTING PLATE FROM A POROUS SUBSTRATE

[75] Inventor: Robert M. Landsman, Norwalk, Conn.

[73] Assignee: LogEtronics, Inc., Springfield, Va.

[21] Appl. No.: 485,178

[22] Filed: July 2, 1974

[51] Int. Cl.² .......................................... B29C 17/00
[52] U.S. Cl. ................... 264/25; 101/401.1; 101/467; 264/22; 264/89; 264/90; 264/92; 264/132; 264/134; 264/293; 264/321; 264/327; 346/76 L; 358/297; 427/53
[58] Field of Search ................. 264/22, 25, 90, 92, 264/89, 93, 131, 132, 134, 293, 237, 348, 321, 327; 117/36.1, 37, 93.3; 156/230, 272, 286; 427/53; 346/76 L; 101/401.1, 463, 467; 178/6.6 TP, 6.6 B, 6.7 R; 96/27 E; 250/316-319; 358/297

[56] References Cited

U.S. PATENT DOCUMENTS

| | | | |
|---|---|---|---|
| 2,825,282 | 3/1958 | Gergen et al. | 264/25 X |
| 2,842,025 | 7/1958 | Craig | 355/77 |
| 2,916,622 | 12/1959 | Nieset | 250/319 |
| 3,036,497 | 5/1962 | Folse | 355/81 |
| 3,397,630 | 8/1968 | Pratt, Jr. | 250/319 X |
| 3,623,869 | 11/1971 | Allard | 250/316 X |
| 3,739,088 | 6/1973 | Landsman | 101/467 X |
| 3,745,586 | 7/1973 | Braudy | 346/76 L |
| 3,787,210 | 1/1974 | Roberts | 96/27 E |
| 3,836,624 | 9/1974 | Ferris | 264/321 |
| 3,909,613 | 9/1975 | Critchlow | 250/316 X |

*Primary Examiner*—Jan H. Silbaugh
*Attorney, Agent, or Firm*—William D. Hall; Geoffrey R. Myers

[57] ABSTRACT

A thermoplastic plate, for example one of polypropylene or nylon, fabricated so it has an open-cell structure, has a radiation transparent cover sheet applied to one face thereof. The cover sheet has an energy absorbing coating (e.g. of carbon and nitrocellulose) in intimate contact with the plate. A modulated laser beam is then transmitted through said cover sheet to selectively transfer some of the energy absorbing material to the plate according to the configuration required to define the areas of relief desired in the plate. The cover sheet is then removed except for the portion of the energy absorbing coating transferred to the plate. The entire surface of the plate is then exposed to infra-red rays. The portions of said surface to which energy absorbing material was transferred are elevated in temperature, by the absorbed infra-red energy, to the point that the structure beneath the transferred material collapses, thus causing those portions to sink to a plane below the plane of the other portions of the plate. Additional infra-red heating steps may be performed to produce further collapse of said portions of the surface, as hereinafter more fully explained.

4 Claims, 11 Drawing Figures

Step 1.

Step 2.

Step 3.

Step 4 (First Form)

Step 4 (First Alternate Form)

Step 4 (Second Alternate Form)

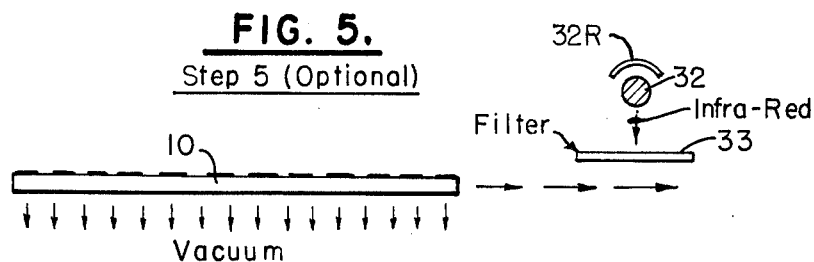
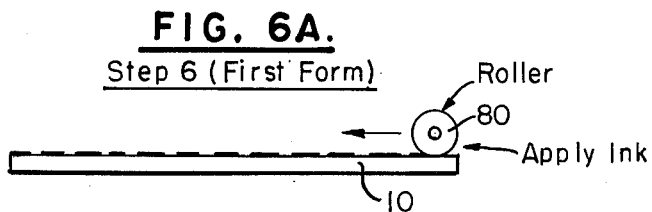
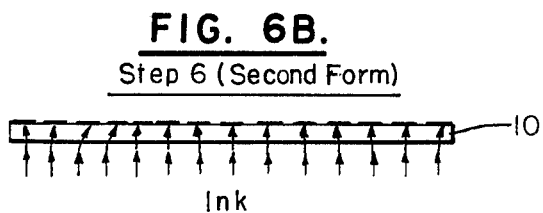
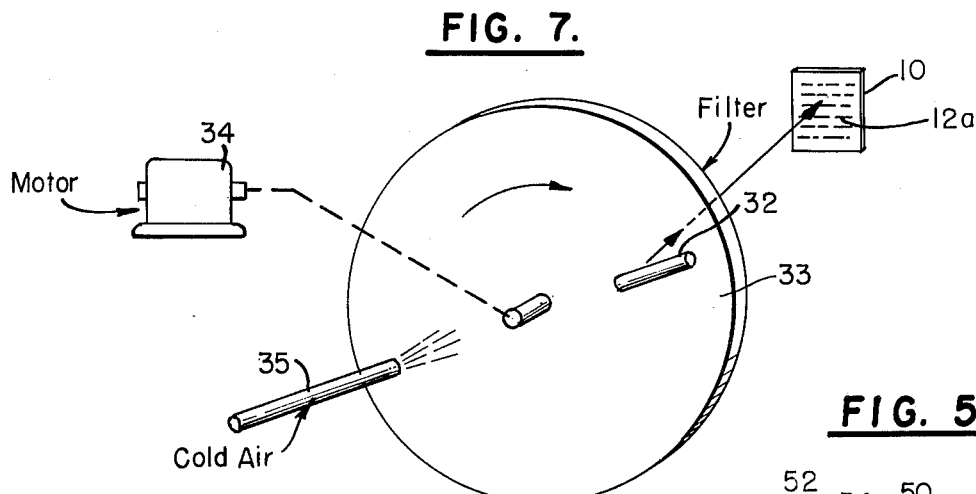
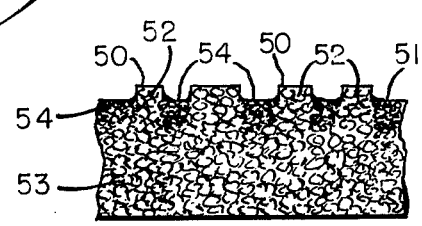

METHOD FOR MAKING A PRINTING PLATE FROM A POROUS SUBSTRATE

BACKGROUND OF THE INVENTION

It has previously been proposed to produce a printing plate by selectively collapsing the open cell structure of a thermoplastic plate to provide relief (depression of non-printing areas), and thereby to define the non-depressed portions necessary for performing a printing operation.

It is an object of this invention to carry out the foregoing basic method in a more effective manner and at lower cost.

It is a further object of the invention to achieve a more complete collapse of the cell structure in the areas where relief is desired, and to better define the planar difference between the raised and relief portions of the plate.

This invention relates to the method of making a printing plate from a plate of thermoplastic material having an open cell structure. A suitable coating material is brought into contact with one surface of the thermoplastic plate. The coating is then caused to adhere to the plate in accordance with the configuration of an area of the surface of the plate corresponding to the image. The coating has different thermal absorption from the plate so that the portion of the plate to which the coating has adhered will absorb infrared rays more readily than other areas of the plate. The remaining coating material which is not adhered to the plate is removed.

The plate is next heated to a temperature near to, but below, the temperature at which the plate structure becomes semisolid.

Infrared rays are then directed upon the surface of the plate carrying the coating, and since these rays are more readily absorbed by the coating than by the plate, the cells of the plate collapse under the coating.

The aforesaid heating step which brought the plate to a temperature near to, but below, the temperature at which the plate became semisolid enables the application of infrared rays to collapse the cells in shorter time than would otherwise be required, resulting in improved fidelity of the plate.

In addition cooling fluid is passed through the innerconnected cell structure of the plate during said infrared heating step to cool the portions of the plate where collapse of the cell is not desired.

BRIEF DESCRIPTION OF THE DRAWINGS

In the drawings:

FIG. 5 is a side view of apparatus for carrying out Step V of the process. This step is optional, but its inclusion is an improvement.

FIG. 5A is a greatly enlarged view of a portion of plate 10 of FIG. 5.

FIG. 6A illustrates Step VI and shows how the resulting plate may be inked for letterpress or letterset printing.

FIG. 6B illustrates a modified form of Step VI and shows how the plate may be inked for screen printing.

FIG. 7 illustrates modified apparatus for carrying out Steps VI and/or V.

DETAILED DESCRIPTION OF THE INVENTION

The plate 10, after the processing hereinafter described, becomes the printing plate. At the start, this is a plate fabricated of polypropylene, nylon, or other thermoplastic material. Preferably the plate 10 should exhibit a sharp transition between its solid and its semi-solid states as its temperature rises. This characteristic is exhibited by polypropylene between 150° and 180° C. If the material has the desired sharp transition, and is preheated to a temperature just below that at which the plate becomes semi-solid, a further surface temperature rise of several degrees Centigrade, resulting from exposure to infra-red rays, will cause structural collapse in the plate and cause the portions of the plate exposed to the infra-red energy to sink below the surface of the plate by 0.0003 inch or more. In other words, the plate material should have a high "melt index". The melt index is sufficiently "high" for the purpose of this invention if it is greater than 3.

It is also preferable that plate 10 have an interconnected open-cell structure, to permit transpiration cooling. This can be easily achieved by preparing the plate in accordance with the instructions specified in lines 57 et seq., of column 3, of my U.S. Pat. No. 3,779,779, entitled "Radiation Etchable Plate", issued Dec. 18, 1973.

In the first step of the method, a radiation transparent cover sheet 11 of polyethylene terephthalate (sold under the trade name Mylar), having an energy absorbing coating 12, such as a mixture of carbon and nitrocellulose, on its underside, is placed in intimate contact with the upper side of plate 10. Thus the carbon and nitrocellulose coating is in direct contact with the upper surface of plate 10.

The aforesaid intimate contact may be maintained in any suitable way, such as by applying a vacuum to the underside of open-celled plate 10, or by applying electrostatic charge(s) to one or both of plate 10 and/or cover sheet 11.

Figure 2:
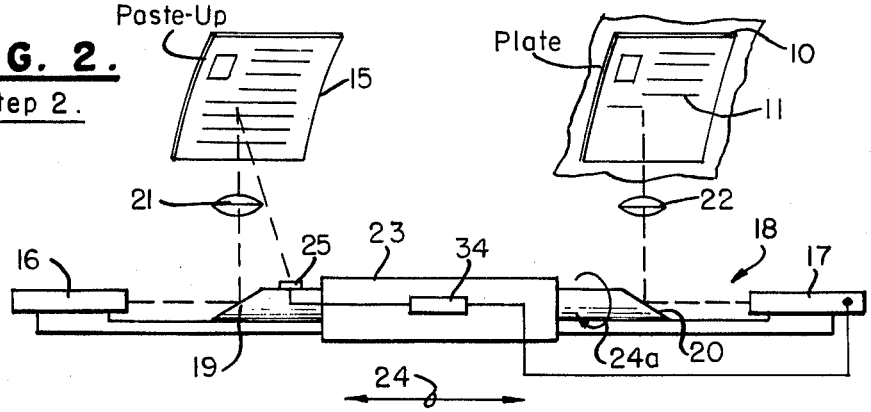
FIG. 2 is a perspective view of Step II of the process.

In Step II, the plate 10, with its cover sheet 11, is next exposed to a very fine laser beam of infra-red energy, which is scanned across the plate and modulated as necessary to transfer the information to be printed to plate 10. This is done in accordance with FIG. 2 of my prior U.S. Pat. No. 3,739,088, granted June 12, 1973, and entitled "Printing Plate Production Method and Apparatus". FIG. 2 of that patent is reproduced here (as FIG. 2) except that in the present drawing the cover sheet 11, bearing energy absorbing coating 12 thereon, is superimposed on plate 10.

In the apparatus illustrated in FIG. 2, the paste-up 15 and plate 10 are supported in curved condition concentrically relative to the axis of an elongated rotating double scanning assembly 18. The lasers 16 and 17 are carried at opposite ends of assembly 18 for their beams to be deflected by rotating angular mirrors 19 and 20 through focusing lenses 21 and 22 to impinge respectively on the paste-up 15 and the plate 10.

As indicated by the arrows 24a and 24, the mirror and lens is rotated by a drive mechanism 23 and is simultaneously moved axially by suitable translational drive means such as a linear induction motor so that the beams from lasers 16 and 17 scan along a spiral path. The entire scanning assembly is suitably mounted on an air bearing member.

The beam from the laser 16 as focussed on the paste-up 15 by the lens 21 is reflected back to a detector 25 which converts the reflected light of the beam into electric signals whose intensities are proportional to the intensity of the reflected light received. The detector 25 is suitably a photomultiplier, or photodiode, and is connected to actuate a modulator 34. The modulator 34 is connected to modulate the intensity of the beam from the laser 17 in a binary manner corresponding to the signals received from the detector 25 for reproducing a template on the plate 10 corresponding to the material represented on the pasteup 15 as described above.

The laser 16 is suitably a neon helium laser which has an operating wavelength of 0.6328 microns, and the lens 21 is selected to focus the beam laser 16 into a spot of about 0.001 inch diameter on the paste-up 15.

When the beam from laser 17 passes through lens 22 and impinges on transparent cover sheet 11, a portion of the energy absorbing carbon and nitrocellulose coating 12 is transferred to the plate 10, where it forms a pattern, normally as a negative of the material to be printed, as will appear.

My prior U.S. Pat. No. 3,816,659, for "Scanning Apparatus", issued June 11, 1974, contains suggestions that may be helpful in constructing the apparatus shown in FIG. 2 of the present application.

The polypropylene plate 10 is formulated to exhibit minimum infra-red absorption. However, where the laser beam has transferred carbon and nitrocellulose to the plate, the absorption of infra-red energy will be much greater. Thus, in response to the infra-red heating steps described below, the energy absorbing portions of the plate will be heated more than the untreated portions of the plate.

The vacuum previously described in connection with Step I may be continued during Steps II and III.

Figure 3:
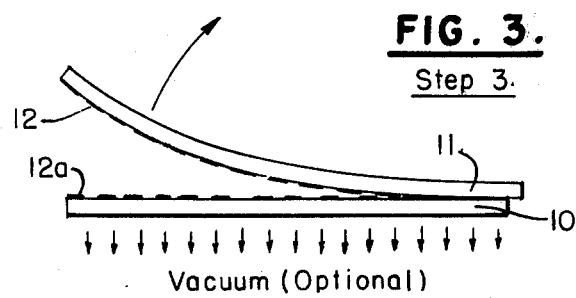
FIG. 3 is a side view of Step III of the process.

Step III consists merely of peeling cover sheet 11 from plate 10, as shown in FIG. 3. This leaves that portion 12a of coating 12 which was transferred to plate 10 intact on that plate.

Instead of employing a polypropylene plate 10 with minimum infra-red absorption, and a coating of carbon and nitrocellulose to increase the absorption, the reverse may be done. That is, one may fabricate a polypropylene plate 10 with maximum absorption and a coating 12 that will reduce the absorption of the plate 10 in the areas to which the coating is transferred. In event such a reversal is employed, the writing step should also be reversed so that transfer of the coating occurs in the areas which will receive ink and print the desired text, instead of in the areas of relief (non-printing areas).

Furthermore, instead of using a carbon and nitrocellulose coating 12 and a laser beam, various other energy absorbing coatings and methods of transferring the same may be employed. Transfer to the plate 10 may be accomplished in any suitable way, including any suitable mechanical method. For example, the pressure transfer of a carbon coating from carbon paper, or of heatabsorbing ink from a typewriter ribbon, may be used. Furthermore, suitable thin metallic foils may be used as energy reflecting material, and methods of transferring such metallic foils to other objects may be used to transfer such thin metallic foils to plate 10. Other suitable coatings and transfer techniques are described in U.S. Pat. No. 3,745,586, issued July 10, 1973 to Robert S. Braudy for "Laser Writing", U.S. Pat. No. 3,787,210, issued Jan. 22, 1974 to Donald Lee Roberts for "Laser Recording Technique Using Combustible Blow-Off", and Woodward, IBM Technical Disclosure Bulletin Vol. 9, No. 11, April 1967, page 1592. Preferably the transfer of the coating to the plate should be by an impact method, several of which methods have been referred to above.

Step IV comprises directing infra-red or other suitable radiant energy onto the imaged surface of plate 10. The time of application, and the intensity of this energy, are carefully selected so that the areas of the surface of plate 10 to which carbon and nitrocellulose 12a have been selectively transferred change viscosity. Consequently, the open-cell structure under such areas collapses, causing the surface in such areas to sink below the surface of the printing areas, which remain solid since the temperature to which they are heated is lower. To facilitate this, the plate may be pre-heated in an oven or by transpiration methods to a temperature just below the thermoplastic transition temperature, so that the infra-red heating step may then be of short duration. This limits the conduction process in the plate, and is therefore a desirable result since heat conduction in the plate, when part of the plate has reached a semi-solid state, reduces the resolution of the resultling printing plate.

Figure 4:
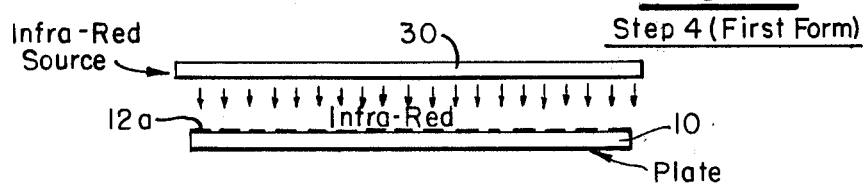
FIG. 4 is a side view of one optional form of Step IV of the process.

I will next describe three ways that the infra-red heating step, just referred to, may be carried out:

1. As shown in FIG. 4, the upper side of plate 10 may be exposed to an infra-red source 30 which heats the entire upper surface of plate 10 simultaneously.

Figure 4A:
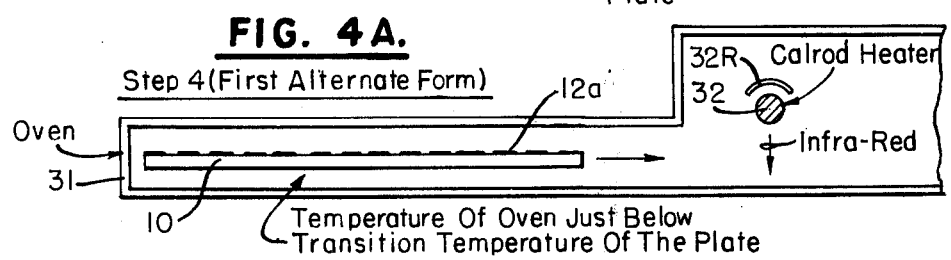
FIG. 4A is a first alternate form for carrying out Step IV of the process.

2. As shown in FIG. 4A, the plate 10 may be held in oven 31 until it achieves a temperature just below the transition temperature. It is then moved to the right under the elongated Calrod heater (or other electric heater in the form of a long rod). The heater 32 may have a suitable reflector 32R to concentrate its heating power along a very limited but straight segment of plate 10. As a given segment of plate 10 passes under heater rod 32, that portion of the segment having the carbon and nitrocellulose coating transferred thereto is heated more, by the absorption of energy. This collapses the structure of the plate under the coated areas of that segment.

If plate 10 has the necessary sharp transition from a solid to a semi-solid state, and the other desired characteristics explained above, and if the heater 32 emits suitable energy toward the plate 10, a cell collapse, sufficient to cause the surface of plate 10 to sink about 0.0003 to 0.01 inches in the area to which carbon has been transferred, will occur as a result of an exposure to the infra-red rays for about one second. The preferred speed of plate 10 past the infra-red heater 32 will give the plate an exposure for about one second.

Figure 4B:
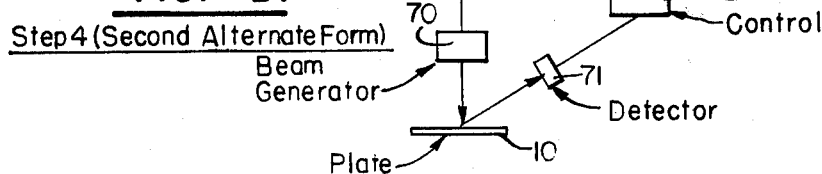
FIG. 4B is a second alternate form for carrying out Step IV of the process.

3. As shown in FIG. 4B, the preferred way of heating the plate is by a controlled beam of infra-red energy, such as the beam of a tungsten halogen lamp (such as G E Quartzline, Type DYS, rated at 600 watts and 120 volts), that scans the surface of plate 10. Energy reflected by the surface of plate 10 operates detector 71 to provide the input to control apparatus 72, which controls radiant source 70 to increase the beam intensity incident upon those areas where the plate surface has a large heat absorptivity due to the transferred coating 12 and to decrease the intensity where the plate surface is uncoated and has a low heat absorptivity. Apparatus for determining the surface reflectivity and for controlling the beam is shown in Craig U.S. Pat. 2,842,025, issued July 8, 1958, entitled "Photographic Method", and in Folse U.S. Pat. No. 3,036,497, issued May 29, 1962, entitled "Photographic Dodging Apparatus".

Step V of the process, shown in FIG. 5, is an improvement, and will now be described. After Steps I through III have been completed, the plate 10 is passed under Calrod heater 32. The infra-red energy from rod 32 passes through filter 33, which may be made of the same material as the plate 10. The filter 33 is therefore particularly absorbent to the radiant energy which has optimum heating effect on those portions of plate 10 which have had no part of the carbon and nitrocellulose coating 12 transferred thereto. This enhances the differential heating effect between the coated portions of the surface of plate 10 (the portions to which some of said coating 12 has been transferred) and the uncoated portions of said surface, resulting in a more complete collapse of the cell structure under the coated portions. This step will not, however, create any collapse of the cell structure of those areas to which no part of the coating 12 was transferred.

As shown in FIG. 7, the filter plate 33 is rotated by motor 34 past the outlet of cold air 35. Hence, any heat from the radiant energy source 32 (directed through filter plate 33 at plate 10) which has been absorbed by filter plate 33 is dissipated without significantly elevating the temperature of the filter plate 33.

If a vacuum is applied to the underside of plate 10 during Step V, air will be induced to flow through the open cells in the surface of plate 10, that is, through the cells in the areas to which no part of coating 12 was transferred. Since the other surface cells have at least partially collapsed, the air flow through them will be wholly or partially impaired. The transpiration cooling therefore enhances the local temperature differences. It does not interfere with collapse of cells in the areas to which some of the coating 12 was transferred, and may, in fact, enhance the cell collapse as a result of the pressure gradient created. On the other hand, air does flow through those portions of the upper surface of plate 10 where there has been no collapse of the cell structure, thus keeping those portions cool and free from collapse.

Instead of applying a vacuum to the lower side of the plate, to generate the above-mentioned air flow, any suitable air pressure differential may be applied across the plate.

FIG. 5A is a greatly enlarged sectional view of FIG. 5. It is noted that the upper surface of the plate 10 has printing portions 50 and areas of relief 51. The cells 52 in the printing portions 50 have not collapsed and are interconnected with the open cells 53 in the body of the plate. The cells 54, just beneath each area of relief, have, however, collapsed and are at least partly sealed against transmission of air therethrough.

If the process is carried out as aforesaid, a printing plate suitable for letterpress or letterset work is produced and may be inked by a roller 80, as shown in Step VI, FIG. 6A.

For screen printing (FIG. 6B), the ink may be forced through the plate from the side which does not contact the paper to the printing side. The ink will travel through the non-collapsed portion of the cell structure to the raised printing portions on the plate and will thus wet those portions with ink. Ink will not, however, pass through those relieved portions of the plate where the structure has been sealed.

Figure 1:
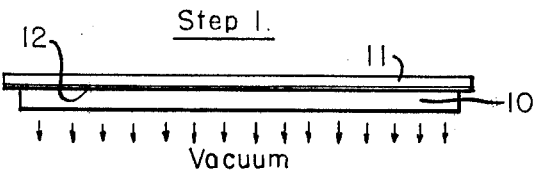
FIG. 1 is a side view of Step I of the process.

If the starting plate 10 of FIG. 1 is composed of urethane rubber (e.g., Estane 58105, a product of B. F. Goodrich Co.) the end product (after Steps I to V) will be suitable for flexographic printing and may be inked as shown in FIG. 6A.

I claim to have invented:

1. The method of making a printing plate, from a thermoplastic plate having an open-cell structure which is poor absorber of infra-red energy, comprising
   bringing an infra-red absorbing coating, which includes carbon and nitrocellulose that is on a transparent cover sheet, into intimate contact with said plate,
   scanning the cover sheet with a laser beam, and modulating the beam, to effect transfer of said coating to the areas of the surface of the plate in which relief is desired, thereby making such areas relatively good absorbers of infra-red energy,
   removing said cover sheet, including the untransferred coating,
   heating said plate to a temperature just below the temperature at which structural collapse begins beneath the coated areas, to thereby reduce the infra-red exposure required to effect said collapse in a subsequent treatment step and to improve the fidelity of said plate by decreasing heat conduction to its uncoated areas during said subsequent treatment step, and
   thereafter applying infra-red energy to the plate to heat the surface to effect a change in the plate due to collapse of the structure under the coated areas of the plate without corresponding collapse of structure under the uncoated areas of the plate, thus providing the plate with printing areas and relieved non-printing areas,
   said step of applying infra-red energy comprising a first and infra-red heating treatment to selectively collapse and seal the areas where relief is desired, and a second infra-red heating treatment characterized by the simultaneous passage of a cooling fluid through the unsealed cells of the plate to enhance the temperature differential between the sealed and unsealed portions of the plate.

2. The method of making a printing plate, from a thermoplastic plate having an open-cell structure which is a poor absorber of infra-red energy, comprising
   bringing an infra-red absorbing coating, which includes carbon and nitrocellulose that is on a transparent cover sheet, into intimate contact with said plate,
   scanning the cover sheet with a laser beam, and modulating the beam, to effect transfer of said coating to the areas of the surface of the plate in which relief is desired, thereby making such areas relatively good absorbers of infra-red energy,
   removing said cover sheet, including the untransferred coating,
   heating said plate to a temperature just below the temperature at which structural collapse begins beneath the coated areas, to thereby reduce the infra-red exposure required to effect said collapse in a subsequent treatment step and to improve the fidelity of said plate by decreasing heat conduction to its uncoated areas during said subsequent treatment step, and thereafter applying the infra-red energy to the plate to heat the surface to effect a change in the plate due to collapse of the structure under the coated areas of the plate without corresponding collapse of structure under the uncoated areas of the plate, thus providing the plate with printing areas and relieved non-printing areas, characterized by applying a pressure gradient to the plate during the infra-red heating step to thereby pass a cooling fluid through those cells which are not required to collapse, to thus preserve their size, while the other cells are not cooled to the infra-red heating step collapses them.

3. The method of making a printing plate, from a thermoplastic plate having an open-cell structure which is a poor absorber of infra-red energy, comprisng bringing an infra-red absorbing coating, which includes carbon and nitrocellulose that is on a transparent cover sheet, into intimate contact with said plate, scanning the cover sheet with a laser beam, and modulating the beam, to effect transfer of said coating to the areas of the surface of the plate in which relief is desired, thereby making such areas relatively good absorbers of infra-red energy, removing said cover sheet, including the untransferred coating, heating said plate to a temperature just below the temperature at which structural collapse begins beneath the coated areas, to thereby reduce the infra-red exposure required to effect said collapse in a subsequent treatment step and to improve the fidelity of said plate by decreasing heat conduction to its uncoated areas during said subsequent treatment step, and thereafter applying infra-red energy to the plate to heat the surface to effect a change in the plate due to collapse of the structure under the coated areas of the plate without corresponding collapse of structure under the uncoated areas of the plate, thus providing the plate with printing areas and relieved non-printing areas, characterized by applying a vacuum to the side of the plate opposite to the side contacted by said coating, during the application of the transfer laser beam as well as during the infra-red heating step, to thus cool those cells which are not required to collapse and thus prevent their collapse while allowing the other cells to continue their collapse during the infra-red heating step.

4. The method of making a printing plate comprising making a thermoplastic plate having an open-cell structure, bringing a coating material into contact with a surface of the plate, effecting adherence of the coating material to only the imaged portion of the area of a surface of the plate, whereby to provide different degrees of thermal absorption for different areas of said surface of the plate and to provide greater absorption of infra-red rays in those where relief is desired, heating the plate to a temperature near to, but below, the temperature at which the plate structure becomes semi-solid, thereafter applying infra-red rays to said surface to effect at least partial collapse of the structure where relief is desired, without such cell collapse in other areas, to thus provide both printing portions and relief portions of the plate, said heating step conditioning the plate for the infra-red heating step to enable the infra-red heating step to collapse the cells in a shorter time than would otherwise be required, resulting in improved fidelity due to decreased heat conduction to uncoated areas of the plate, and passing cooling fluid through the residual interconnected open cell structure of the plate during said infra-red heating step to cool the portions of the plate where relief is not desired and thus avoid cell collapse in those areas.

* * * * *

UNITED STATES PATENT OFFICE
CERTIFICATE OF CORRECTION

Patent No. 4,064,205　　　　　　　　　Dated December 20, 1977

Inventor(s) Robert M. Landsman

It is certified that error appears in the above-identified patent and that said Letters Patent are hereby corrected as shown below:

Column 1, line 50, "cell" should be --cells--.
Column 3, line 22, after "beam" insert --from--.
Column 6, line 40, cancel "and".
Column 7, line 12, cancel "to" and insert --and--.
Column 7, line 16, change "comprisng" to --comprising--.

Signed and Sealed this

Ninth Day of May 1978

[SEAL]

Attest:

RUTH C. MASON
Attesting Officer

LUTRELLE F. PARKER
Acting Commissioner of Patents and Trademarks